(12) United States Patent
Heil et al.

(10) Patent No.: US 10,989,421 B2
(45) Date of Patent: *Apr. 27, 2021

(54) SYSTEM AND APPROACH FOR WATER HEATER COMFORT AND EFFICIENCY IMPROVEMENT

(71) Applicant: Ademco Inc., Golden Valley, MN (US)

(72) Inventors: David Heil, Robbinsdale, MN (US); Ravindra Khosla, Maple Grove, MN (US); Frederick Hazzard, Plymouth, MN (US)

(73) Assignee: Ademco Inc., Golden Valley, MN (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/192,708

(22) Filed: Nov. 15, 2018

(65) Prior Publication Data

US 2019/0086101 A1  Mar. 21, 2019

Related U.S. Application Data

(63) Continuation of application No. 14/964,392, filed on Dec. 9, 2015, now Pat. No. 10,132,510.

(51) Int. Cl.
*F24D 19/10* (2006.01)
*G05B 19/04* (2006.01)
(Continued)

(52) U.S. Cl.
CPC ..... *F24D 19/1069* (2013.01); *F24D 19/1081* (2013.01); *G05B 19/042* (2013.01);
(Continued)

(58) Field of Classification Search
CPC .......... F24D 19/1069; F24D 19/1081; F24D 2240/26; G05D 23/01; G05B 19/042; G05B 2219/2658
See application file for complete search history.

(56) References Cited

U.S. PATENT DOCUMENTS 2,331,718 A  10/1943  Newton
2,920,126 A  1/1960  Hajny
(Continued)

FOREIGN PATENT DOCUMENTS

CA  2158120 A1  3/1997
CN  201772614 U  3/2011
(Continued)

OTHER PUBLICATIONS

AO Smith, "IComm Remote Monitoring System, Instruction Manual," 64 pages, Jun. 2009.
(Continued)

*Primary Examiner* — Marc E Norman
(74) *Attorney, Agent, or Firm* — Shumaker & Sieffert, P.A.

(57) ABSTRACT

A system for heating water to improve safety and efficiency. The system may have normal operation measured in time. After a time of normal operation, a water temperature setpoint may be checked. If the setpoint is not at a certain level, normal operation may continue. If the setpoint is within the certain level, water temperature may be measured. If the water temperature is less than a desired level, one or more draws of water may be measured for a preset temperature drop. If the draws do not meet the temperature drop, a return to check the setpoint may be made. If the draws meet the temperature drop, the setpoint may be reduced and a time of normal operation may be measured to determine whether a burn cycle occurs within the time. If not, normal operation may continue; but if so, a return to check the setpoint may be made.

18 Claims, 4 Drawing Sheets

(51) Int. Cl.
*G05D 23/01* (2006.01)
*G05B 19/042* (2006.01)

(52) U.S. Cl.
CPC ......... *G05D 23/01* (2013.01); *F24D 2240/26* (2013.01); *G05B 2219/2658* (2013.01)

(56) References Cited

U.S. PATENT DOCUMENTS

| | | |
|---|---|---|
| 3,272,432 A | 9/1966 | Davidson |
| 3,759,279 A | 9/1973 | Smith, Jr. |
| 3,833,428 A | 9/1974 | Snyder et al. |
| 3,847,350 A | 11/1974 | Thompson |
| 3,849,350 A | 11/1974 | Matsko |
| 3,909,816 A | 9/1975 | Teeters |
| 3,948,439 A | 4/1976 | Heeger |
| 4,127,380 A | 11/1978 | Straitz, III |
| 4,131,413 A | 12/1978 | Ryno |
| 4,221,557 A | 9/1980 | Jalics |
| 4,305,547 A | 12/1981 | Cohen |
| 4,324,207 A | 4/1982 | Leuthard |
| 4,324,944 A | 4/1982 | Weihrich et al. |
| RE30,936 E | 5/1982 | Kmetz et al. |
| 4,333,002 A | 6/1982 | Kozak |
| 4,421,062 A | 12/1983 | Padilla, Sr. |
| 4,438,728 A | 3/1984 | Fracaro |
| 4,467,178 A | 8/1984 | Swindle |
| 4,483,672 A | 11/1984 | Wallace et al. |
| 4,507,938 A | 4/1985 | Hama et al. |
| 4,508,261 A | 4/1985 | Blank |
| 4,511,790 A | 4/1985 | Kozak |
| 4,568,821 A | 2/1986 | Boe |
| 4,588,875 A | 5/1986 | Kozak et al. |
| 4,638,789 A | 1/1987 | Ueki et al. |
| 4,655,705 A | 4/1987 | Shute et al. |
| 4,692,598 A | 9/1987 | Yoshida et al. |
| 4,696,639 A | 9/1987 | Bohan, Jr. |
| 4,734,658 A | 3/1988 | Bohan, Jr. |
| 4,742,210 A | 5/1988 | Tsuchiyama et al. |
| 4,770,629 A | 9/1988 | Bohan, Jr. |
| 4,778,378 A | 10/1988 | Dolnick et al. |
| 4,830,601 A | 5/1989 | Dahlander et al. |
| 4,834,284 A | 5/1989 | Vandermeyden |
| 4,906,337 A | 3/1990 | Palmer |
| 4,965,232 A | 10/1990 | Mauleon et al. |
| 4,977,885 A | 12/1990 | Herweyer et al. |
| 4,984,981 A | 1/1991 | Pottebaum |
| 4,986,468 A | 1/1991 | Deisinger |
| 5,007,156 A | 4/1991 | Hurtgen |
| 5,037,291 A | 8/1991 | Clark |
| 5,077,550 A | 12/1991 | Cormier |
| 5,103,078 A | 4/1992 | Boykin et al. |
| 5,112,217 A | 5/1992 | Ripka et al. |
| 5,125,068 A | 6/1992 | McNair et al. |
| 5,126,721 A | 6/1992 | Butcher et al. |
| 5,222,888 A | 6/1993 | Jones et al. |
| 5,232,582 A | 8/1993 | Takahashi et al. |
| 5,236,328 A | 8/1993 | Tate et al. |
| 5,280,802 A | 1/1994 | Comuzie, Jr. |
| 5,317,670 A | 5/1994 | Elia |
| 5,391,074 A | 2/1995 | Meeker |
| 5,424,554 A | 6/1995 | Marran et al. |
| 5,442,157 A | 8/1995 | Jackson |
| 5,567,143 A | 10/1996 | Servidio |
| 5,622,200 A | 4/1997 | Schulze |
| 5,660,328 A | 8/1997 | Momber |
| 5,779,143 A | 7/1998 | Michaud et al. |
| 5,791,890 A | 8/1998 | Maughan |
| 5,797,358 A | 8/1998 | Brandt et al. |
| 5,857,845 A | 1/1999 | Paciorek |
| 5,896,089 A | 4/1999 | Bowles |
| 5,968,393 A | 10/1999 | Demaline |
| 5,971,745 A | 10/1999 | Bassett et al. |
| 5,975,884 A | 11/1999 | Dugger |
| 6,053,130 A | 4/2000 | Shellenberger |
| 6,059,195 A | 5/2000 | Adams et al. |
| 6,069,998 A | 5/2000 | Barnes et al. |
| 6,075,923 A | 6/2000 | Wu |
| 6,080,971 A | 6/2000 | Seitz et al. |
| 6,208,806 B1 | 3/2001 | Langford |
| 6,212,894 B1 | 4/2001 | Brown et al. |
| 6,236,321 B1 | 5/2001 | Troost, IV |
| 6,261,087 B1 | 7/2001 | Bird et al. |
| 6,271,505 B1 | 8/2001 | Henderson |
| 6,286,464 B1 | 9/2001 | Abraham et al. |
| 6,293,471 B1 | 9/2001 | Stettin et al. |
| 6,299,433 B1 | 10/2001 | Gauba et al. |
| 6,350,967 B1 | 2/2002 | Scott |
| 6,351,603 B2 | 2/2002 | Waithe et al. |
| 6,363,218 B1 | 3/2002 | Lowenstein et al. |
| 6,371,057 B1 | 4/2002 | Henderson |
| 6,375,087 B1 | 4/2002 | Day et al. |
| 6,390,029 B2 | 5/2002 | Alphs |
| RE37,745 E | 6/2002 | Brandt et al. |
| 6,410,842 B1 | 6/2002 | McAlonan |
| 6,455,820 B2 | 9/2002 | Bradenbaugh |
| 6,553,946 B1 | 4/2003 | Abraham et al. |
| 6,560,409 B2 | 5/2003 | Troost, IV |
| 6,606,968 B2 | 8/2003 | Iwama et al. |
| 6,629,021 B2 | 9/2003 | Cline et al. |
| 6,631,622 B1 | 10/2003 | Ghent et al. |
| 6,633,726 B2 | 10/2003 | Bradenbaugh |
| 6,684,821 B2 | 2/2004 | Lannes et al. |
| 6,701,874 B1 | 3/2004 | Schultz et al. |
| 6,732,677 B2 | 5/2004 | Donnelly et al. |
| 6,794,771 B2 | 9/2004 | Orloff |
| 6,795,644 B2 | 9/2004 | Bradenbaugh |
| 6,835,307 B2 | 12/2004 | Talbert et al. |
| 6,845,110 B2 | 1/2005 | Gibson |
| 6,861,621 B2 | 3/2005 | Ghent |
| 6,880,493 B2 | 4/2005 | Clifford |
| 6,920,377 B2 | 7/2005 | Chian |
| 6,934,862 B2 | 8/2005 | Sharood et al. |
| 6,936,798 B2 | 8/2005 | Moreno |
| 6,955,301 B2 | 11/2005 | Chian et al. |
| 6,959,876 B2 | 11/2005 | Chian et al. |
| 6,967,565 B2 | 11/2005 | Lingemann |
| 6,973,819 B2 | 12/2005 | Ruhland et al. |
| 6,995,301 B1 | 2/2006 | Shorrosh |
| 7,032,542 B2 | 4/2006 | Donnelly et al. |
| 7,065,431 B2 | 6/2006 | Patterson et al. |
| 7,076,373 B1 | 7/2006 | Munsterhuis et al. |
| 7,088,238 B2 | 8/2006 | Karaoguz et al. |
| 7,103,272 B2 | 9/2006 | Baxter |
| 7,117,825 B2 | 10/2006 | Phillips |
| 7,137,373 B2 | 11/2006 | Seymour, II et al. |
| 7,162,150 B1 | 1/2007 | Welch et al. |
| 7,167,813 B2 | 1/2007 | Chian et al. |
| 7,221,862 B1 | 5/2007 | Miller et al. |
| 7,252,502 B2 | 8/2007 | Munsterhuis |
| 7,255,285 B2 | 8/2007 | Troost et al. |
| 7,298,968 B1 | 11/2007 | Boros et al. |
| 7,317,265 B2 | 1/2008 | Chian et al. |
| 7,346,274 B2 | 3/2008 | Bradenbaugh |
| 7,373,080 B2 | 5/2008 | Baxter |
| 7,380,522 B2 | 6/2008 | Krell et al. |
| 7,432,477 B2 | 10/2008 | Teti |
| 7,434,544 B2 | 10/2008 | Donnelly et al. |
| 7,469,550 B2 | 12/2008 | Chapman, Jr. et al. |
| 7,506,617 B2 | 3/2009 | Paine |
| 7,526,539 B1 | 4/2009 | Hsu |
| 7,561,057 B2 | 7/2009 | Kates |
| 7,603,204 B2 | 10/2009 | Patterson et al. |
| 7,613,855 B2 | 11/2009 | Phillips et al. |
| 7,623,771 B2 | 11/2009 | Lentz et al. |
| 7,634,976 B2 | 12/2009 | Gordon et al. |
| 7,672,751 B2 | 3/2010 | Patterson et al. |
| 7,712,677 B1 | 5/2010 | Munsterhuis et al. |
| 7,744,007 B2 | 6/2010 | Beagen et al. |
| 7,744,008 B2 | 6/2010 | Chapman, Jr. et al. |
| 7,770,807 B2 | 8/2010 | Robinson et al. |
| 7,798,107 B2 | 9/2010 | Chian et al. |
| 7,804,047 B2 | 9/2010 | Zak et al. |
| 7,902,959 B2 | 3/2011 | Yamada et al. |
| 7,932,480 B2 | 4/2011 | Gu et al. |

(56) References Cited

U.S. PATENT DOCUMENTS

| | | | |
|---|---|---|---|
| 7,934,662 B1 | 5/2011 | Jenkins | |
| 7,970,494 B2 | 6/2011 | Fima | |
| 7,974,527 B1 | 7/2011 | Adler | |
| 8,061,308 B2 | 11/2011 | Phillips | |
| 8,074,894 B2 | 12/2011 | Beagen | |
| 8,083,104 B2 | 12/2011 | Roetker et al. | |
| 8,111,980 B2 | 2/2012 | Bradenbaugh | |
| 8,165,726 B2 | 4/2012 | Nordberg et al. | |
| 8,204,633 B2 | 6/2012 | Harbin, III et al. | |
| 8,245,987 B2 | 8/2012 | Hazzard et al. | |
| 8,322,312 B2 | 12/2012 | Strand | |
| 8,360,334 B2 | 1/2013 | Nold et al. | |
| 8,367,984 B2 | 2/2013 | Besore | |
| 8,422,870 B2 | 4/2013 | Nelson et al. | |
| 8,485,138 B2 | 7/2013 | Leeland | |
| 8,498,527 B2 | 7/2013 | Roetker et al. | |
| 8,600,556 B2 | 12/2013 | Nesler et al. | |
| 8,606,092 B2 | 12/2013 | Amiran et al. | |
| 8,660,701 B2 | 2/2014 | Phillips et al. | |
| 8,667,112 B2 | 3/2014 | Roth et al. | |
| 8,726,789 B2 | 5/2014 | Clark | |
| 8,770,152 B2 | 7/2014 | Leeland et al. | |
| 8,813,687 B2* | 8/2014 | Chaudhry | F24H 1/207 122/14.1 |
| 9,080,769 B2 | 7/2015 | Bronson et al. | |
| 9,122,283 B2 | 9/2015 | Rylski et al. | |
| 9,195,242 B2 | 11/2015 | Zobrist et al. | |
| 9,228,746 B2 | 1/2016 | Hughes et al. | |
| 9,234,664 B1 | 1/2016 | Hayner et al. | |
| 9,249,986 B2 | 2/2016 | Hazzard et al. | |
| 9,268,342 B2 | 2/2016 | Beyerle et al. | |
| 9,310,098 B2 | 4/2016 | Buescher et al. | |
| 9,702,568 B2 | 7/2017 | Miller et al. | |
| 9,702,590 B2 | 7/2017 | Wen et al. | |
| 9,784,472 B2 | 10/2017 | Stevens et al. | |
| 9,799,201 B2 | 10/2017 | Hazzard et al. | |
| 9,920,930 B2 | 3/2018 | Heil et al. | |
| 10,088,852 B2 | 10/2018 | Hazzard et al. | |
| 10,132,510 B2 | 11/2018 | Heil et al. | |
| 2002/0099474 A1 | 7/2002 | Khesin | |
| 2003/0091091 A1 | 5/2003 | Patterson et al. | |
| 2003/0093186 A1 | 5/2003 | Patterson et al. | |
| 2004/0042772 A1 | 3/2004 | Whitford et al. | |
| 2004/0079749 A1 | 4/2004 | Young et al. | |
| 2005/0038566 A1 | 2/2005 | Chian | |
| 2006/0027571 A1 | 2/2006 | Miyoshi et al. | |
| 2006/0208099 A1 | 9/2006 | Chapman, Jr. et al. | |
| 2006/0272830 A1 | 12/2006 | Fima | |
| 2007/0023333 A1 | 2/2007 | Mouhebaty et al. | |
| 2007/0133965 A1 | 6/2007 | Miller et al. | |
| 2007/0210177 A1 | 9/2007 | Karasek | |
| 2007/0292810 A1 | 12/2007 | Maiello et al. | |
| 2008/0003530 A1 | 1/2008 | Donnelly et al. | |
| 2008/0023564 A1 | 1/2008 | Hall | |
| 2008/0048046 A1 | 2/2008 | Wagner et al. | |
| 2008/0188995 A1 | 8/2008 | Hotton et al. | |
| 2008/0197206 A1 | 8/2008 | Murakami et al. | |
| 2008/0314999 A1 | 12/2008 | Strand | |
| 2009/0101085 A1 | 4/2009 | Arensmeier et al. | |
| 2009/0117503 A1 | 5/2009 | Cain | |
| 2010/0065764 A1 | 3/2010 | Canpolat | |
| 2010/0095906 A1 | 4/2010 | Leeland et al. | |
| 2010/0163016 A1 | 7/2010 | Pan | |
| 2010/0187219 A1 | 7/2010 | Besore et al. | |
| 2010/0324962 A1 | 12/2010 | Nesler et al. | |
| 2011/0031323 A1 | 2/2011 | Nold et al. | |
| 2011/0044671 A1 | 2/2011 | Amiran et al. | |
| 2011/0123179 A1 | 5/2011 | Roetker et al. | |
| 2011/0254661 A1 | 10/2011 | Fawcett et al. | |
| 2011/0259322 A1 | 10/2011 | Davis et al. | |
| 2011/0305444 A1 | 12/2011 | Pussell | |
| 2012/0023212 A1 | 1/2012 | Roth et al. | |
| 2012/0060771 A1 | 3/2012 | Brian et al. | |
| 2012/0060829 A1 | 3/2012 | DuPlessis et al. | |
| 2012/0118989 A1 | 5/2012 | Buescher et al. | |
| 2012/0271465 A1 | 10/2012 | Zobrist et al. | |
| 2013/0104814 A1 | 5/2013 | Reyman | |
| 2013/0193221 A1 | 8/2013 | Buescher et al. | |
| 2014/0060457 A1 | 3/2014 | Hill et al. | |
| 2014/0175183 A1 | 6/2014 | Phillips et al. | |
| 2014/0202549 A1 | 7/2014 | Hazzard et al. | |
| 2014/0203093 A1 | 7/2014 | Young et al. | |
| 2014/0212821 A1 | 7/2014 | Banu et al. | |
| 2014/0312127 A1 | 10/2014 | Rylski et al. | |
| 2015/0083384 A1 | 3/2015 | Lewis, Jr. et al. | |
| 2015/0120067 A1 | 4/2015 | Wing et al. | |
| 2015/0127184 A1 | 5/2015 | Harbin, III et al. | |
| 2015/0276265 A1 | 10/2015 | Davari et al. | |
| 2015/0276268 A1 | 10/2015 | Hazzard et al. | |
| 2015/0277463 A1 | 10/2015 | Hazzard et al. | |
| 2015/0354833 A1 | 12/2015 | Kreutzman | |
| 2016/0146505 A1 | 5/2016 | Hill | |
| 2016/0178234 A1 | 6/2016 | Hayden et al. | |
| 2016/0178239 A1* | 6/2016 | Thornton | F24H 1/185 700/295 |
| 2016/0266588 A1 | 9/2016 | Ward et al. | |
| 2017/0343241 A1 | 11/2017 | Chen et al. | |
| 2018/0088611 A1 | 3/2018 | Hazzard et al. | |
| 2019/0331363 A1 | 10/2019 | Peng et al. | |
| 2020/0004231 A1 | 1/2020 | Anderson et al. | |
| 2020/0191439 A1 | 6/2020 | Hughes | |

FOREIGN PATENT DOCUMENTS

| | | |
|---|---|---|
| CN | 201909441 U | 7/2011 |
| CN | 102213489 A | 10/2011 |
| CN | 203203717 U | 9/2013 |
| EP | 0356609 A1 | 3/1990 |
| EP | 0531072 A1 | 3/1993 |
| EP | 0699316 B1 | 7/1999 |
| EP | 0967440 A2 | 12/1999 |
| EP | 1148298 B1 | 10/2004 |
| EP | 1621814 A2 | 2/2006 |
| EP | 1178748 B1 | 10/2006 |
| EP | 2108140 B1 | 6/2012 |
| FR | 2820206 A1 | 8/2002 |
| GB | 2211331 A | 6/1989 |
| JP | H08264469 A | 10/1996 |
| JP | 2005283039 A | 10/2005 |
| JP | 2006084322 A | 3/2006 |
| JP | 2008008548 A | 1/2008 |
| JP | 2011220560 A | 11/2011 |
| TW | 1431223 B | 3/2014 |
| WO | 9718417 A1 | 5/1997 |
| WO | 2008102263 A2 | 8/2008 |
| WO | 2009022226 A2 | 2/2009 |
| WO | 2009061622 A1 | 5/2009 |
| WO | 2011104592 A1 | 9/2011 |

OTHER PUBLICATIONS

Filibeli et al., "Embedded Web Server-Based Home Appliance Networks," Journal of Network and Computer Applications, vol. 30, pp. 499-514, Apr. 2007.

Halfbakery.com, "Hot Water Alarm," 2 pages, Sep. 4, 2002.

Heat Transfer Products Inc., "Specification for Heat Transfer Products, Inc., Vision 3 System," 2 pages, Mar. 17, 2006.

Hiller, "Dual-Tank Water Heating System Options," ASHRAE Transactions: Symposia, pp. 1028-1037, Downloaded Nov. 16, 2012.

Honeywell International Inc., "CS8800 General Assembly, Drawing No. 50000855," 2 pages, Oct. 24, 2008.

Honeywell International Inc., "Thermopile Assembly, Drawing No. 50006821," 1 page, Jun. 18, 2010.

Honeywell International Inc., "Thermopile Element, Drawing No. 5001 0166," 1 page, Apr. 1, 2005.

Honeywell International Inc, "Thermopile General Assembly, Drawing No. 50006914," 1 page, Jan. 12, 2006.

Honeywell International Inc., Photograph of a CS8800 Thermocouple Assembly, 1 page, saved Oct. 9, 2014.

http://nachi.org/forum/f22/dual-water-heater-installations-36034/, "Dual Water Heater Installation," 10 pages, printed Oct. 1, 2012.

(56) References Cited

OTHER PUBLICATIONS http://www.whirlpoolwaterheaters.com/learn_more/energysmartelectricwaterheateroperation.aspx, "Energy Smart Electric Water Heater Operation," 3 pages, prior to Nov. 13, 2012.
http://www.whirlpoolwaterheaters.com/learn-more/electric-water-heaters/6th-sense%E2% . . . , "Whirlpool Energy Smart Electric Water Heater, Learn More," 3 pages, printed Jan. 15, 2015.
Industrial Controls, "Basics of PID Control (Proportional+Integral+Derivative)," downloaded from https://web.archive.org/web/20110206195004/http://www.industrialcontrolsonline.com/training/online/basics-pid-control-portionalintegralderivative, 4 pages, Feb. 6, 2011.
InspectAPedia, "Guide to Alternative Hot Water Sources," 6 pages, printed Oct. 1, 2012.
Johnson Controls, "K Series BASO Thermocouples, Heating Line Product Guide 435.0, Thermocouples Section, Product Bulletin K Series," 8 pages, Oct. 1998.
Lennox, "Network Control Panel, User's Manual," 18 pages, Nov. 1999.
Moog, "M3000 Control System, RTEMP 8, Remote 8-Channel Temperature Controller with CanOpen Interface," 6 pages, Nov. 2004.
Process Technology, "Troubleshooting Electric Immersion Heaters," downloaded from http://www.processtechnology.com/troubleshootheaters.html, 3 pages, Mar. 22, 2010.
Raychem, "HWAT-ECO," Tyco Thermal Control, 4 pages, Feb. 2012.
Reliance Water Heaters, "Service Handbook for Standard residential FVIR Gas Water Heaters, Models: G/LORT, G/LORS, G/LBRT, G/LBRS/G/LBCT/G/LBCS, G/LKRT, G/LKRS, G/LKCT, G/LART, G/LARS, G/LXRT, GLQRT—Series 200/201 and Series 202/203," 44 pages, Nov. 2009.
"Results and Methodology of the Engineering Analysis for Residential Water Heater Efficiency Standards," 101 pages, Oct. 1998.
Techno Mix, "Installation-Series and Parallel," downloaded from www.chinawinds.co.uk/diy_tips/installation_series_and_parallel.html, 5 pages, printed Oct. 1, 2012.
Triangle Tube, "Prestige Solo Condensing High Efficiency Gas Boiler," 4 pages, revised Apr. 30, 2012.
Prosecution History from U.S. Appl. No. 14/964,392, dated Dec. 7, 2017 through Jul. 31, 2018, 56 pp.

* cited by examiner

SYSTEM AND APPROACH FOR WATER HEATER COMFORT AND EFFICIENCY IMPROVEMENT

This patent application is a continuation of U.S. patent application Ser. No. 14/964,392, filed Dec. 9, 2015. U.S. patent application Ser. No. 14/964,392, filed Dec. 9, 2015, is hereby incorporated by reference.

BACKGROUND

The present disclosure pertains to systems designed to heat fluids and particularly to devices that pertain to the efficiency and safety of heating fluids.

SUMMARY

The disclosure reveals a system for heating water in a controlled manner to improve safety and efficiency. The system may have a mode of normal operation measured in terms of time. After a certain amount of time of normal operation, a temperature setpoint of the system may be checked. If the setpoint is not at a certain level, then normal operation may continue. If the setpoint is at the certain level, then water temperature of the system may be measured. If the water temperature is less than a desired level, then one or more draws of water may be checked for a preset temperature drop. If the draws do not meet the temperature drop, then a return to the setpoint may be made with subsequent actions as described herein. If the draws meet the temperature drop, then the setpoint may be reduced and normal operation may be measured in terms of time to determine if a burn cycle occurs within a preset amount of time. If not, then normal operation may continue; but if so, a return to a setpoint check may be made along with the subsequent actions as noted.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Residential and commercial water heaters may use a ten to fifteen degree differential to maintain tank temperature. The temperature control may work sufficiently to deliver hot water; however, after multiple draws, the water tank can begin to stratify, leading to a set point at 135 degrees Fahrenheit (F) producing a temperature near 150 degrees F. at the top of the tank for supply. The hot water is not necessarily safe or comfortable for the user and also may waste more energy by increasing the top of the tank's ambient differential. The present algorithm may limit the return to a setpoint only during excess demand cycles. The reduction in return to setpoint may still maintain sufficient hot water; however, the burner advance turnoff could protect the user from scalding and excess energy consumption.

The burning algorithm may track the gas valve history for the prior four hours of operation. A counter may track the number of burner on and off and total burner on time of each recovery. In the condition of 2 or more burn cycles in one hour, the algorithm may go live and on the third reheat cycle, the return to setpoint may be limited from zero to ten degrees F., depending on a total prior draw load and total burn time tracked leading up to the 3rd draw with in that hour. The reduction in setpoint may allow the regeneration of heat without the overshoot of tank temperature at the top of the tank. The hot water tank algorithm's reduction in set point may stay live for up to four hours to allow the tank to equalize tank temp. At that point, the return to set point may occur and water temp may rise to the desired tank temp within two to three degrees F.

Figure 1:
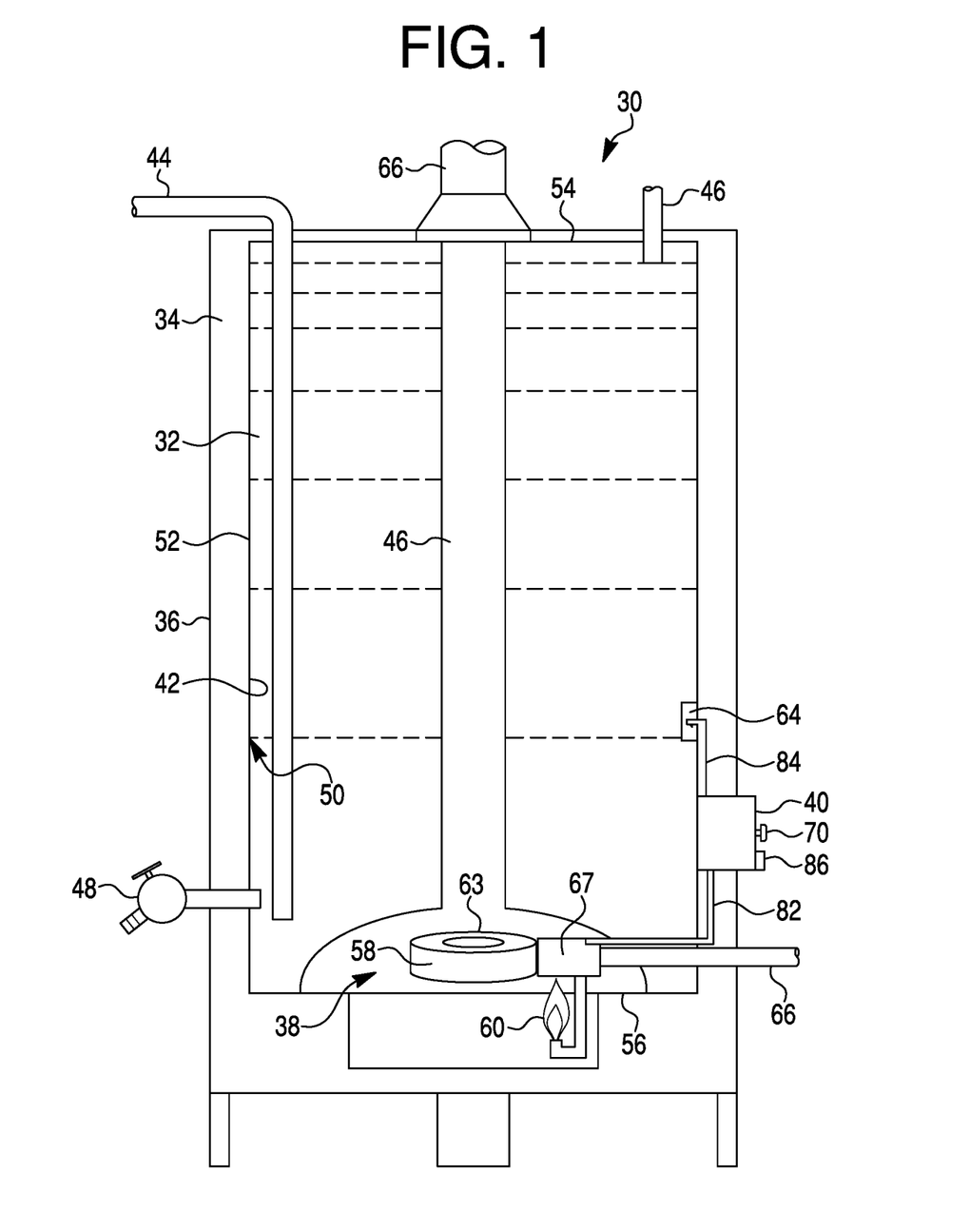
FIG. 1 is a diagram of a water heater that incorporates the present system and approach for heating water.

FIG. 1 is a diagram of a water heater 30 that may incorporate the present system and approach for heating water. A water tank 32 may have an input supply pipe or drip tube 44 for receiving fresh water and an output pipe or tube 46 for drawing water, particularly heated water as needed. Tank 32 may have an inner surface 42 and an outer surface 52. Around tank 32 may be an insulating layer 34 and an external shell 36. In tank 32 may be a rust inhibiting layer 50. Toward a bottom of tank 32 may be a drainage valve 48. Water heater 30 and tank 32 may have a top surface 54. At a bottom of heater 30 and tank 32 at a bottom surface 56 may be a heater 38 which can use electricity, gas or a combination to create heat for increasing a temperature of water in tank 32. In the diagram of FIG. 1, a gas burner 58 may be used as an illustrative example of heater 38. There may be a combustion chamber 63 that is supplied with a fuel such as gas in a tube 66. Combustion chamber 63 may have an enclosure 59 and or exhaust pipe flue 66 that runs from chamber 63 through tank 32 and top surface 54 to an outside exhaust vent.

An ignition source 40 such as a pilot light may be fed fuel from tube 66. A valve 67 may be electrically opened and closed. Valve 67 may close if not kept warm by pilot 60, particular in the event that the pilot 60 is extinguished and cannot light the burner in an event that an electric signal from a controller 40 is a command to open valve 67. Also, if pilot 60 goes out, then a thermal valve (a component of valve 67) connected to pilot 60 closes if not kept warm by pilot 60. The precautionary measures are for preventing a release of gas from a non-functioning burner 38 and pilot 60.

A sensor 64 may be connected to controller 40 to provide a temperature of water in tank 32 to controller 40. Input signals 70, sensor signals 84 and settings 86 may go to controller 40. Control signals 82 may be provided by controller 40. Controller 40 may also have controls and indicators for a user. Examples may be gauges, lights, setting selectors, and the like. A controller 40 may be of various versions of models that vary from simple to complex arrangements. Controller 40 may operate relative to a program or algorithm as indicated herein.

Figure 2:
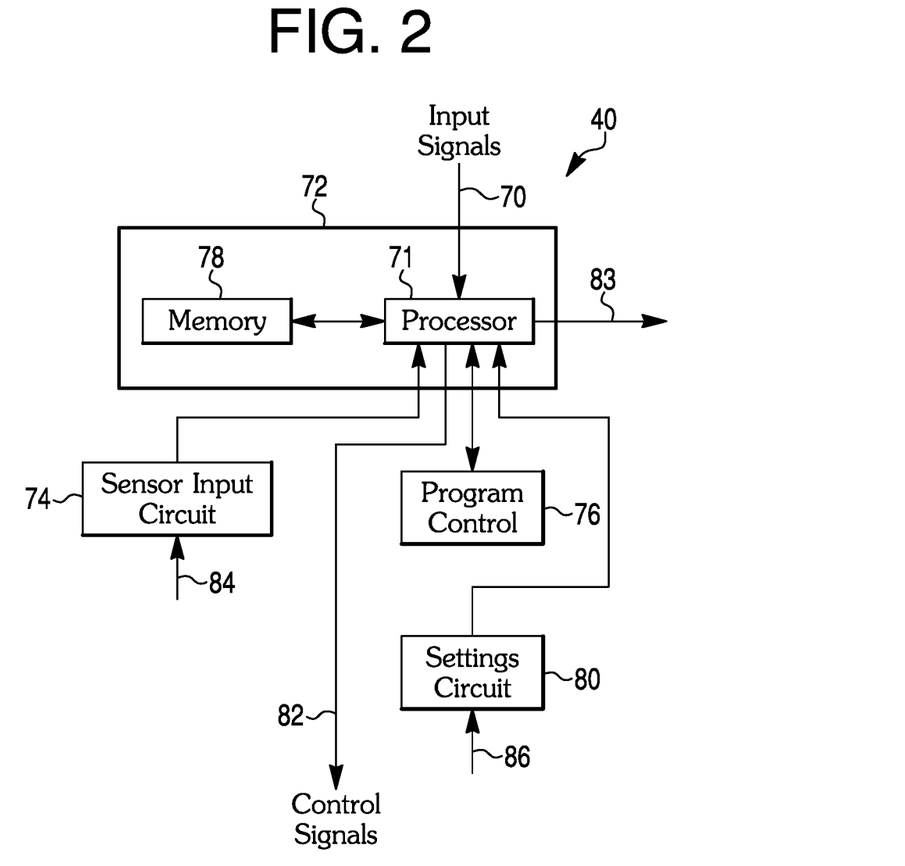
FIG. 2 is a diagram of an illustrative example of a controller for a water heater.

A diagram in FIG. 2 shows an illustrative example of controller 40. Input signals 70 may go to a processing block 72 which may incorporate a processor 71 and memory 78 that are connected to each other. A connection line 84 may connect one or more sensors 64 to a sensor input buffer circuit 74. Sensor signals may be provided by sensor input buffer circuit 74 to processor 71. Settings 86, such as those of temperature and time, and the like, may go to settings buffer circuit 80 and then on to processor 71. Output control signals may proceed from processor 71 to along connection line 82 to one or more valve actuators, and other actuators or components, and the like. Indicator signals may proceed from processor 71 along a connection line 83 to various instruments such as displays, gauges, indicator lights, sound emanating devices, and the like. Temperature and other setpoints may be entered along connection line 86 to a settings buffer circuit 80. From circuit 80, setting signals may go to processor 71. Entries from inputs may be from thermostats, keyboards, tunable knobs, switches, and so forth.

Figure 3:
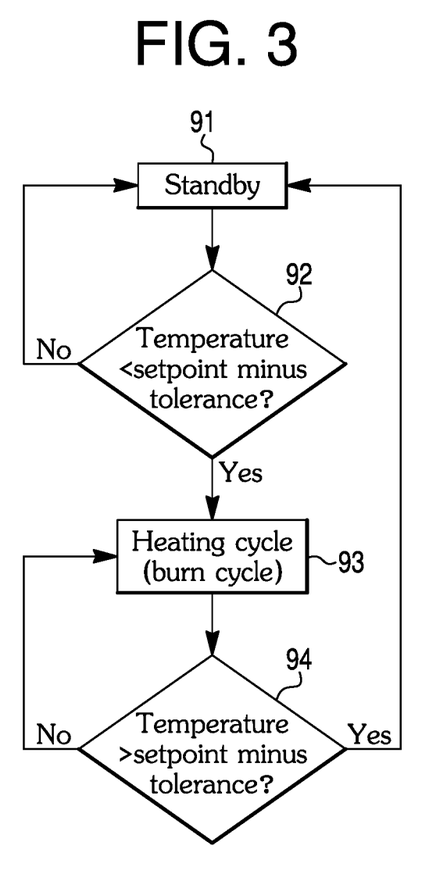
FIG. 3 is a diagram of a general water heater flow chart.

FIG. 3 is a diagram of a general water heater flow chart. Symbols may represent blocks, steps, statuses, activity or other items, even though they might be referred to as "symbols" for purposes of the diagram. Symbol 91 may indicate that a water temperature control system is in standby. A question of whether water temperature is less that a setpoint minus tolerance may be asked at symbol 92. If an answer is no, then there may be a return to standby. If the answer is yes, then a heating cycle (burn cycle) may occur at symbol 93. At symbol 94, a question of whether the water temperature is greater than the setpoint plus tolerance may be asked. If an answer is no, then the heating cycle may occur. If the answer is yes, then a return to standby may be made.

Figure 4:
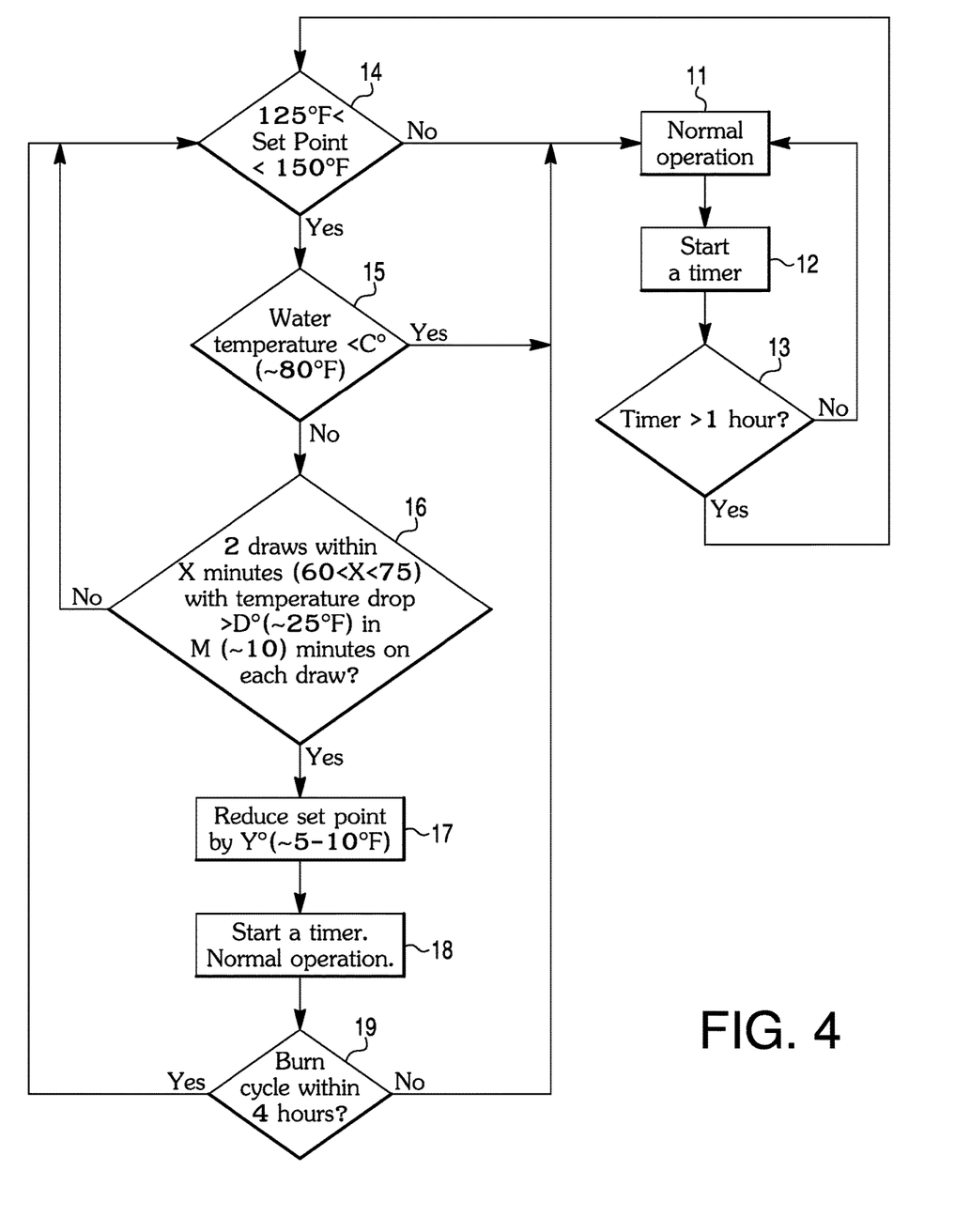
FIG. 4 is a diagram of water temperature control of a water heater system to prevent generating temperatures of water beyond a certain temperature to improve safety and energy savings.

FIG. 4 is a diagram of water temperature control that may prevent a water heater system from generating temperatures of water beyond a certain temperature to improve safety and energy savings. Symbol 11 may represent normal operation of a water heater. A timer may be started at symbol 12. A question at symbol 13 may ask whether the timer has run for more than one hour. If an answer is no, then a return may be made to symbol 11 and symbol 12. The question at symbol 13 may be asked again. If the answer is yes, then a question at symbol 14 may be asked as to whether a set point of the water heater is greater than 125 degrees Fahrenheit (F) or less than 150 degrees F. If an answer is no, then a return may be made to symbol 11 of normal operation. If the answer is yes, then a question at symbol 15 may be asked as to whether a water temperature in the water heater is less than C*(88 degrees F.). If the answer is yes, then a return to normal operation at symbol 11 may occur. If the answer is no, then at symbol 16 a question asked may be whether two draws within X minutes (60<X<75) with a temperature drop greater than D*(~25 degrees F.) in M(~10) minutes on each draw. If an answer is no, then a return to symbol 14 may be made with sequences to follow symbol 14 as indicated herein. If the answer is yes, then the set point may be reduced by Y*(~5 to 10 degrees F.) at symbol 17. Subsequently, a timer may be started and normal operation can occur at symbol 18. A question may then be asked at symbol 19 as to whether a burn cycle is within four hours. If an answer is no, then a return to normal operation at symbol 11 may occur. If the answer is yes, then a return may be made to symbol 14 with sequences of operation to follow as indicated herein.

To recap, a water heater control mechanism may incorporate a processor having a memory, a temperature sensor situated in a tank of a water heater and connected to the processor, a heater connected to a valve or switch, a setpoint device connected to the processor, an actuator attached to the valve and connected to the processor, and a program situated in the memory. The processor may have a normal operation for controlling temperature of water in the tank relative to a setpoint for temperature of the water. The program may provide steps that incorporate timing a length of normal operation, reading the setpoint device if the timing of a length of the normal operation exceeds a pre-determined time, reading the temperature sensor if a reading of the setpoint device is between two pre-determined temperatures, measuring one or more draws in terms of time and temperature if the reading of the temperature sensor is equal to or greater than a pre-determined temperature, reducing a setting of the setpoint device if the terms of time and temperature are within pre-defined terms of time and temperature for a draw, timing to when a burn cycle occurs, and reading the setpoint device if a time until a burn cycle occurs is greater than a pre-determined time.

If the reading of the setpoint device is not between the two pre-determined temperatures, then the processor may return to normal operation.

A return to reading the setpoint device may occur if the terms of time temperature for a draw are not within the pre-defined terms of time and temperature for a draw.

If the timing of the length of the normal operation does not exceed the pre-determined time, then the processor may continue in normal operation.

The two pre-determined temperatures for the setpoint device may be between A degrees Fahrenheit and B degrees Fahrenheit.

If the reading of the temperature sensor is equal to or less than the pre-determined temperature, then the processor may return to normal operation.

The pre-determined temperature for the temperature sensor may be C degrees Fahrenheit.

The pre-defined terms of time and temperature may incorporate J draws or K pair or pairs of draws with a period between D minutes and E minutes with a temperature drop of F degrees Fahrenheit in G minutes on each draw.

A return of the processor to normal operation may occur if the time until the burn cycle occurs is equal to or less than the pre-determined time.

The pre-determined time for when the burn cycle occurs may be H hours.

Illustrative example numbers for the variables may be A~125, B~150, C~80, D~60, E~75, F~25, G~10, H~4, J~2 and K~1.

A fluid heater system may incorporate a tank, a heater at the tank, a fluid input on the tank, a fluid output on the tank, a heater control device connected to the heater, a temperature sensor situated in the tank, a temperature setpoint mechanism, a timer, and a processor connected to the heater control device, the temperature sensor, the temperature setpoint mechanism and the timer. The processor may control the heater control device, adjust the temperature setpoint mechanism and operate a timer in response to the temperature sensor, according to a program.

A maximum temperature of a fluid in the tank may be controlled by the processor and heater control device according to the program.

A setpoint on temperature setpoint mechanism may result in a temperature of a fluid in the tank greater than a temperature indicated by the setpoint due to temperature stratification of the fluid in the tank. The program may limit a return to a setpoint just during excess demand cycles, to reduce the temperature of the fluid in the tank increased by temperature stratification.

The heater may be a gas burner. The heater control device may incorporate a valve connected to the gas burner, and an actuator that controls the valve and is connected to the processor. The program may track a history of the valve that reveals a number of times that a burner turns on and off and the total on-time of the burner. After a sequence of a pre-determined number of times that the burner turns on and off, the program may limit a return to the setpoint by a certain number of degrees less than the setpoint of the temperature setpoint mechanism according to the total on-time of the burner and amount of fluid draw from the tank within a given period of time.

The heater may be electric.

Steps of the program may incorporate 1) measuring a time of a normal operation of the processor, 2) checking a setpoint of the temperature setpoint mechanism if a time of the normal operation exceeds an A hour duration, 3) detecting a temperature less than B degrees Fahrenheit of the fluid if the setpoint of the temperature setpoint mechanism is between C degrees and D degrees Fahrenheit to take the processor out of normal operation, 4) making E draws of fluid from the tank within an F minute duration between a G minute duration and an H minute duration with a temperature drop detected by the temperature sensor greater than I degrees Fahrenheit of a J minute duration on each draw occurring that results in reducing the setpoint by K degrees between L degrees and M degrees, or in absence of each draw occurring as such results in going to step 3), 5) measuring a time of another normal operation of the processor, and 6) determining that an electric heat cycle has occurred within an N hour duration and thus resulting in returning to step iii), or determining that an electric heat cycle has not occurred thus resulting in the processor remaining in normal operation.

A, B, C, D, E, F, G, H, I, J, K, L, M, and N may be numbers associated with units as fitting in their context.

One or more items may be selected from a group incorporating A being about 1, B being about 80, C being about 125, D being about 150, E being about 2, F being between G and H, G being about 60, H being about 75, I being about 25, J being about 10, K being between L and M, L being about 5, M being about 10, and N being about 4.

One or more items may be selected from a group comprising A is between 0.05 and 5, B is between 40 and 120, C is 80, D is 200, E is between 1 and 10, F is between G and H, G is 5, H is 250, I is between 5 and 125, J is between 1 and 60, K is between L and M, L is 0, M is 50, and N is between 0.1 and 10.

A water heater may incorporate a tank, a water heater attached to the tank, a control device connected to the water heater, a temperature sensor in the tank, a temperature setpoint mechanism, and a controller connected to the control device, temperature sensor and a temperature setpoint mechanism. The processor may operate according to a program that causes normal operation of the heater to be overridden by an occasional setpoint adjustment to ensure efficiency and a supply safe hot water temperature.

The program may incorporate occasionally checking the setpoint of the temperature setpoint mechanism, continuing normal operation if the setpoint is at an acceptable setting, obtaining a temperature of water in the tank from the temperature sensor if the setpoint is absent from a predetermined setting, returning to normal operation if the temperature of the water is at predetermined magnitude, obtaining a temperature drop evaluation of one or more draws of water if the temperature of the water is absent from a predetermined magnitude, rechecking the setpoint if the temperature drop evaluation is high, reducing the setpoint if the temperature drop evaluation is low, starting timing normal operation of the heater to detect whether a burn cycle occurs within a predetermined period of time, rechecking the setpoint if the burn cycle occurs, and continuing normal operation if a burn cycle does not occur.

U.S. patent application Ser. No. 14/225,308, filed on Mar. 25, 2014, is hereby incorporated by reference.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A method for controlling a water heater system, the method comprising:
   controlling a heater control device in accordance with a temperature setpoint and a control program, the heater control device configured to actuate a heater at a water storage tank, wherein a setpoint above a predetermined threshold of the temperature setpoint can result in a temperature of water in the water storage tank greater than a temperature indicated by the temperature setpoint due to temperature stratification of fluid in the water storage tank; and
   limiting a return of the water in the water storage tank to the temperature setpoint during excess demand cycles to reduce the temperature of the water in the water storage tank increased by temperature stratification.

2. The method of claim 1, further comprising tracking a number of times the heater has been actuated and the total on-time of the heater.

3. The method of claim 2, wherein the limiting the return of the water in the water storage tank to the temperature setpoint comprises temporarily reducing the temperature setpoint after a predetermined number of actuations of the heater.

4. The method of claim 3, further comprising:
   determining a number of degrees to reduce the temperature setpoint based on the total on-time of the heater and an amount of water drawn from the water storage tank within a given length of time.

5. A system for controlling a temperature of water in a tank, the system comprising:
   a memory;
   a processor coupled to the memory and configured to:
      time a length of normal operation of a controller to obtain a first time of operation, wherein for the normal operation the controller is configured to maintain a temperature of water in a tank to a setpoint temperature;
      in response to the first time of operation exceeding a first predetermined length of time, read the setpoint temperature;
      in response to the setpoint temperature being between an upper temperature limit and a lower temperature limit, measure a temperature of the water in the tank;
      in response to the temperature of the water in the tank being equal to or greater than a threshold temperature, measure one or more water draws from the tank in terms of time and temperature;

in response to the terms of time and temperature being within pre-defined terms of time and temperature for one of the one or more draws, reduce a setting of the temperature setpoint to exit the normal operation of the controller;

upon reducing the setting of the temperature setpoint, start a timer;

stop the timer when a heat cycle begins to obtain a second time of operation; and in response to the second time of operation being greater than a second predetermined length of time, read the temperature setpoint.

6. The system of claim 5, wherein the processor is further configured to return to the normal operation of the controller in response to determining that the second time of operation is less than the second predetermined length of the time.

7. The system of claim 5, wherein the processor is further configured to return to the normal operation of the controller in response to determining that the setpoint temperature is not between the upper temperature limit and the lower temperature limit.

8. The system of claim 5, wherein the processor is further configured to read the temperature setpoint in response to determining that the terms of time and temperature are not within pre-defined terms of time and temperature for one of the one or more draws.

9. The system of claim 5, wherein the processor is further configured to continue in normal operation in response to determining that the first time of operation timing does not exceed the first predetermined time.

10. The system of claim 5, wherein the upper temperature limit is about 150 degrees F. and the lower temperature limit is about 125 degrees F.

11. The system of claim 5, wherein the processor is further configured to return to the normal operation of the controller in response to determining that the temperature of the water in the tank is equal to or less than the threshold temperature.

12. The system of claim 5, wherein the threshold temperature is about 80 degrees F.

13. The system of claim 5, wherein the pre-defined terms of time and temperature comprise at least two draw in with a period between about 60 and about 75 minutes between the draws with a temperature drop of about 25 degrees F. in 10 minutes on each draw.

14. The system of claim 5, wherein the controller comprises the processor and the memory.

15. A device for controlling a water heater system, the device comprising:

a memory;

a processor coupled to the memory and configured to:

controlling a heater control device in accordance with a temperature setpoint and a control program, the heater control device configured to actuate a heater at a water storage tank, wherein a setpoint above a predetermined threshold of the temperature setpoint can result in a temperature of water in the water storage tank greater than a temperature indicated by the temperature setpoint due to temperature stratification of fluid in the water storage tank; and limiting a return of the water in the water storage tank to the temperature setpoint during excess demand cycles to reduce the temperature of the water in the water storage tank increased by temperature stratification.

16. The device of claim 15, wherein the processor is further configured to track a number of times the heater has been actuated and the total on-time of the heater.

17. The device of claim 16, wherein to limiting the return of the water in the water storage tank to the temperature setpoint, the processor is further configured to temporarily reduce the temperature setpoint after a predetermined number of actuations of the heater.

18. The device of claim 17, wherein the processor is further configured to determine a number of degrees to reduce the temperature setpoint based on the total on-time of the heater and an amount of water drawn from the water storage tank within a given length of time.

* * * * *